UNITED STATES PATENT OFFICE.

JOHN A. JUST, OF SYRACUSE, NEW YORK.

PROCESS OF MAKING LACTIC ACID.

No. 868,444.      Specification of Letters Patent.      Patented Oct. 15, 1907.

Application filed November 21, 1906. Serial No. 344,354.

*To all whom it may concern:*

Be it known that I, JOHN A. JUST, a citizen of the United States, and resident of Syracuse, New York, have invented certain new and useful Improvements in Processes of Making Lactic Acid, of which the following is a specification.

This invention relates to processes of making lactic acid and consists in a method of purifying whey and similar impure solutions of milk sugar in order to adapt them to lactic fermentation and thereafter preparing lactic acid from such fermentable solutions; all as more fully hereinafter set forth and as claimed.

Whey is a complex liquid, containing in addition to the dissolved milk sugar which is its principal solid component, a wide variety of dissolved and suspended substances in less proportion, such as fat, proteids, ash constituents and salts of organic acids. It readily enters into lactic fermentation as it contains all the substances necessary for bacterial growth, but in its natural state it does not directly yield a lactic acid of desirable purity and taste. In part this is due to contamination with free fatty acids originating from the fat in the whey. Small traces of butyric acid, a body of strong and unpleasant taste and odor, are very deleterious to the quality of lactic acid. This fat as it occurs in the whey is probably mostly in suspension but in such a state of fine subdivision as to escape the butter-making and cheese-making operation. On crystallizing the milk sugar by evaporation the fat adheres to the crystals and again goes into suspension on re-solution. Whey also contains considerable proteid matter; much more than is desirable for good lactic fermentation. This proteid occurs both in solution and suspension and consists largely of very fine particles of casein which have not gone down with the curd in cheese-making, dissolved and coagulated milk albumen, peptones and other bodies. The milk albumen can be coagulated to some extent on heating but it forms a very fine coagulum which cannot well be separated mechanically and which, like the fat, on crystallizing the milk sugar, adheres to the crystals and goes into suspension on re-solution. The fine casein behaves in the same manner.

I have discovered that by admixing a mineral absorbent with the whey and then drying, that the fat and undesirable solids will adhere to the mineral matter and will not again go into suspension when the dried mixture is leached while the milk sugar and other solubles do redissolve. A solution prepared in this manner, it is found, contains sufficient of these other solubles, such as ash constituents and nitrogen, probably in the form of soluble amids and peptones, to serve as a nutrient medium for lactic bacteria and the milk sugar in solution can be readily and smoothly fermented to form a lactic acid of a pure sour taste. Impure milk sugars such as ordinary crude commercial articles, can be dissolved in water to form a solution very much like whey, and this solution treated in the same way as whey. A suitable mode of carrying out my process is as follows:—

Mix the whey or crude milk sugar solution with infusorial earth (silica), talc, asbestos, or other suitable mineral absorbent, and dry the mixture on a hot surface so constructed as to make a continuous operation, as for instance a revolving cylinder suitably heated to expel the water from the mixture. Sufficient earth is added to bring the mass to a consistency which will pass over the heated surface in a film. The film may be more or less thick as desired and the consistency of the mixture may be that of a creamy paste. The water is thus expelled and the albumen is coagulated, by which I mean that the drying coagulates the albumen, which is then taken up by the mineral matter and held. On leaching the dry, shavings-like product of the drying operation, a clear and nearly pure solution of milk sugar is obtained, this solution however still containing sufficient nutrients to enable the fermentation of the milk sugar and being eminently suited for this purpose as it is free from fat and solid or coagulated proteid matter these insolubles having been taken up by the absorbent during the drying operation and not again given up to the leaching water. To this solution a suitable ferment is added, for instance rennet or rennet extract. The solution is maintained in any suitable manner at about 82 to 106 degrees F. and sufficient rennet is added so that the smallest quantity will diffuse throughout the mass. Rennet contains numerous and active lactic organisms. A suitable alkali or alkaline earth like lime, for instance, in suitable form is kept present or else added from time to time to maintain the free lactic acid formed neutralized as fast as it forms, and thus prevent interruption of the process of fermentation by excess of acid. Chalk ($CaCO_3$) for instance may be used. The lactate of lime solution thus obtained is treated with sulfuric acid, for instance, or any other acid which forms an insoluble salt with the lime. Thus sulfate of lime insoluble in water is precipitated, while the lactic acid goes into solution. The sulfate of lime is separated by filtration and the diluted lactic acid suitably concentrated to a commercial strength.

Theoretically one molecule of milk sugar forms four molecules of lactic acid as follows:

$$C_{12}H_{22}O_{11} + H_2O = 4C_3H_6O_3.$$

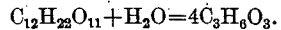

This shows that the milk sugar takes up one molecule of water during its fermentation, which is fixed by the ferment to produce four molecules of lactic acid.

As an example of the carrying out of the process, enough absorbent is added to the solution to bring the mass to the consistency of a creamy paste. The ferment may be added to the solution obtained after leaching in the proportion of one pint to one thousand pounds of solution. The lime is run in to neutralize the acidity as fast as formed. Sufficient sulfuric acid is added to liberate the lactic acid from the lactate of lime.

I claim and desire to obtain by Letters Patent the following:

1. The process of making lactic acid from impure milk sugar solutions, which consists in mixing an impure milk sugar solution with a mineral absorbent to form a magma, drying the magma to expel water and render impurities insoluble, leaching the dried material to obtain a purified milk sugar solution and adding a lactic ferment to the solution.

2. The process of making lactic acid from impure milk sugar solutions, which consists in mixing an impure milk sugar solution with a mineral absorbent to form a magma, drying the magma to expel water and render impurities insoluble, leaching the dried material to obtain a purified milk sugar solution, adding a lactic ferment and a neutralizing body to the solution and recovering the lactic acid formed.

3. The process of making lactic acid from impure milk sugar solutions which consists in mixing an impure milk sugar solution with a mineral absorbent to form a magma, drying the magma to expel water and render impurities insoluble, leaching the dried material to obtain a purified milk sugar solution, adding a lactic ferment to the solution and recovering the lactic acid formed.

4. The process of making lactic acid from impure milk sugar solutions which consists in mixing an impure milk sugar solution with infusorial earth to form a magma, forming the magma into a film and rapidly drying to expel water and render impurities insoluble, leaching the dried material to obtain a purified milk sugar solution, adding a lactic ferment and a calcareous neutralizing body to the solution and recovering the lactic acid formed by decomposing the lime salt so produced by decomposition with an acid forming an insoluble calcium salt.

5. The process of making lactic acid from impure milk sugar solutions which consists in mixing an impure milk sugar solution with a mineral absorbent to form a magma, drying the magma to expel water and render impurities insoluble, leaching the dried material to obtain a purified milk sugar solution, adding a rennet preparation containing lactic ferments to the solution and recovering the lactic acid formed.

In testimony whereof I have signed this specification in the presence of two subscribing witnesses.

JOHN A. JUST.

Witnesses:
OLIN A. FOSTER,
A. K. SCHNEIDER.